(12) United States Patent
Adimatyam et al.

(10) Patent No.: US 8,522,272 B2
(45) Date of Patent: Aug. 27, 2013

(54) USER-CUSTOMIZED PROGRAMMING

(75) Inventors: Venkata S. Adimatyam, Irving, TX (US); Sameer Vasant Gavade, Irving, TX (US)

(73) Assignee: Verizon Patent and Licensing Inc., Basking Ridge, NJ (US)

(\*) Notice: Subject to any disclaimer, the term of this patent is extended or adjusted under 35 U.S.C. 154(b) by 305 days.

(21) Appl. No.: 12/909,950

(22) Filed: Oct. 22, 2010

(65) Prior Publication Data
US 2012/0102529 A1   Apr. 26, 2012

(51) Int. Cl.
| H04H 60/33 | (2008.01) |
| H04H 60/32 | (2008.01) |
| H04N 7/10 | (2006.01) |
| H04N 7/025 | (2006.01) |
| H04N 5/445 | (2011.01) |
| G06F 3/00 | (2006.01) |
| G06F 13/00 | (2006.01) |

(52) U.S. Cl.
USPC ........ 725/34; 725/9; 725/14; 725/16; 725/32; 725/37; 725/46

(58) Field of Classification Search
USPC .......................................................... 725/106
See application file for complete search history.

(56) References Cited

U.S. PATENT DOCUMENTS

| 7,886,003 | B2* | 2/2011 | Newnam et al. ............... 709/204 |
| 2005/0262542 | A1* | 11/2005 | DeWeese et al. .............. 725/106 |
| 2006/0020973 | A1* | 1/2006 | Hannum et al. ................ 725/46 |
| 2007/0250849 | A1* | 10/2007 | Faber et al. ...................... 725/24 |
| 2010/0251094 | A1* | 9/2010 | Holm et al. .................... 715/230 |

\* cited by examiner

Primary Examiner — Justin Shepard

(57) ABSTRACT

A method may include transmitting a list of programs for customization to a user device and receiving, from the user device, a selection by the user of one of the listed programs. The method may further include determining a list of clips to recommend to the user based on a user profile associated with the user and transmitting the list of clips to the user device for customizing the selected program. Further, the method may include receiving a selection of one of the clips from the user device and inserting the clip into the selected program to generate a customized program.

21 Claims, 15 Drawing Sheets

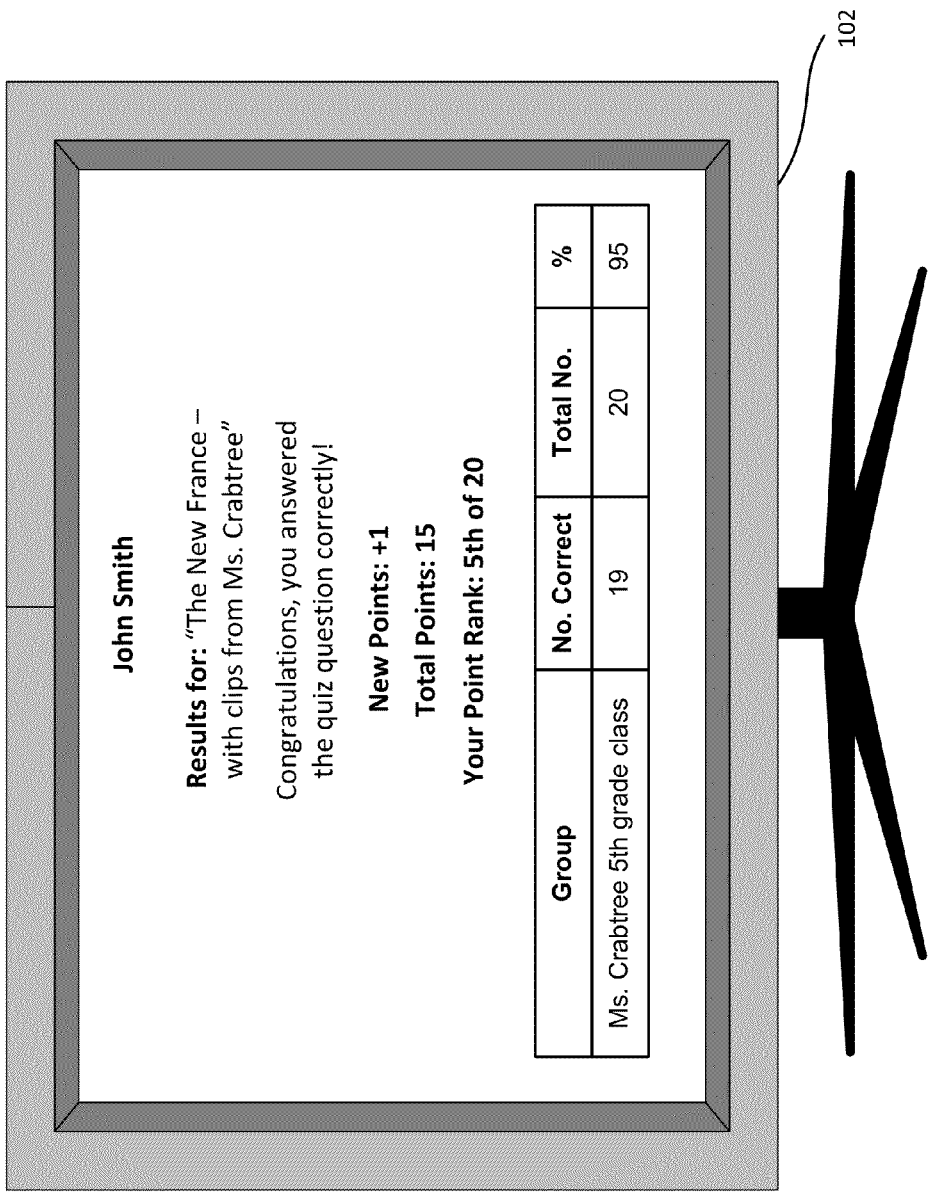

USER-CUSTOMIZED PROGRAMMING

BACKGROUND INFORMATION

Historically, content customers typically only consumed professionally-produced media programs (e.g., network television programs, educational programs, etc.). This type of content and content consumption was popularized by large networks (e.g., NBC, CBS, and ABC) and the technology of the time (e.g., broadcast television and radio). New technology has allowed consumers to generate their own content for upload to the Internet for distribution to other users. Youtube has popularized this type of content and consumption.

BRIEF DESCRIPTION OF THE DRAWINGS

FIGS. 9 and 10 are diagrams of an exemplary report generated for the custom program generated in the example of FIGS. 6A through 6F.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

In one embodiment disclosed below, a user may customize professionally-produced programs by adding, for example, user-generated content (e.g., a "clip"). As used herein, the term "clip" may include a short (e.g., shorter than the program) piece of content that a user adds to another program. A clip may include an interactive quiz, an interactive video or map, a video, audio, etc.). A "program" may include any type of content, including audio content, video content, or multimedia content.

Figure 1:
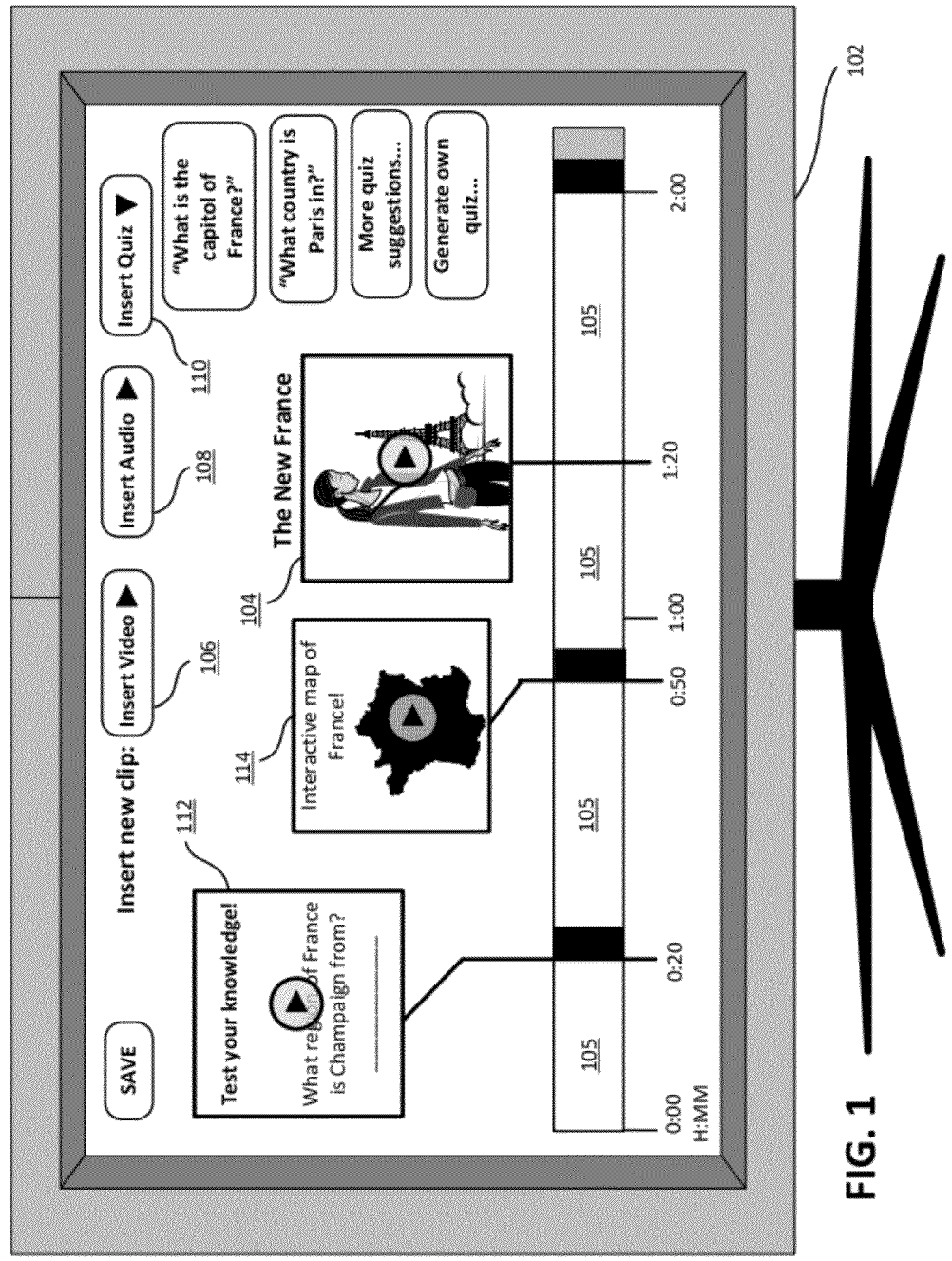
FIG. 1 is a diagram of an overview of an exemplary embodiment for customizing programs.

As shown in FIG. 1, for example, a user customizes a two-hour long program titled "The New France" with various different clips. A display 102 shows the program "The New France" in a window 104 along with a timeline 105 of the program. The user is presented with a button 106 for inserting video (e.g., a user-generated video, or interactive video); a button 108 for inserting audio; and a button 110 for inserting a quiz. The user is also presented with recommended quiz questions, such as "What is the capitol of France?" As shown in a window 112, the user has inserted a quiz question at the twenty-minute (0:20) mark regarding the region of France that produces Champaign. As shown in a window 114, the user has inserted an interactive map of France at the fifty-minute (0:50) mark. The user has also inserted two clips 182 and 184 at the end of the program, which may include user-generated video clips, for example.

In one embodiment, the user may save the customized program for sharing with others. The user may also generate reports regarding the number of people who have viewed the customized program, the number of correct answers provided in response to quiz questions (e.g., by group or region), etc. Users who view the custom program may also view reports about the custom program, such as the number of people who answered a question correctly (e.g., by group or region).

Figure 2:
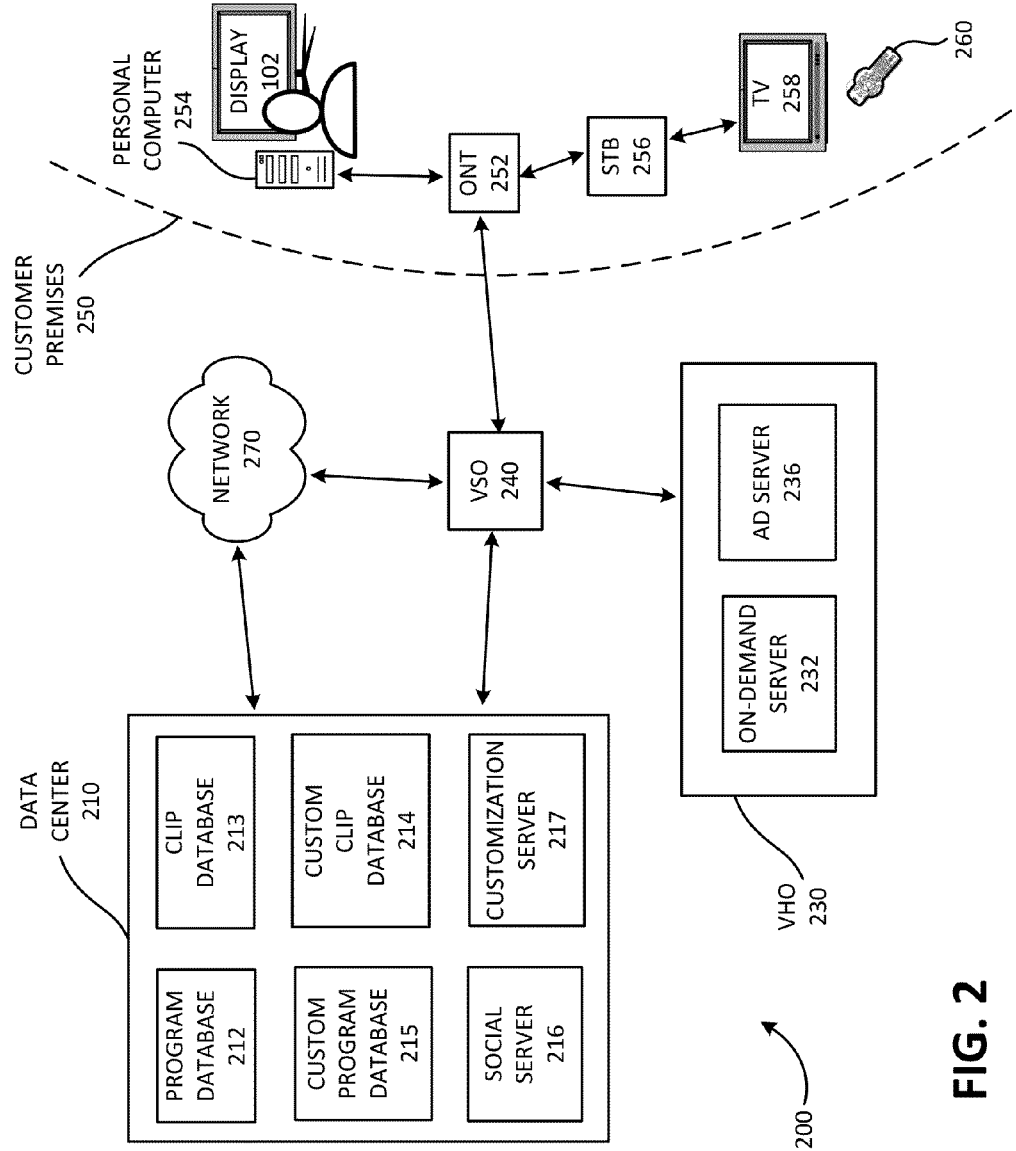
FIG. 2 is a diagram of an exemplary network for implementing different embodiments for customizing programs.

FIG. 2 is a diagram of an exemplary network 200 for implementing the embodiment of FIG. 1 and other embodiments. Network 200 may include a data center 210, a video hub office (VHO) 230, a video service office (VSO) 240, customer premises 250, and a network 270. Customer premises 250 (e.g., a customer's home or a teacher's school) may include an optical network terminal (ONT) 252, a personal computer 254, a set-top box (STB) 256, a television 258, and a remote control 260. Devices in customer premises 250 may be considered "user devices."

ONT 252 may receive data, e.g., on a fiber optic cable, and may transfer the data to the appropriate device in customer premises 250, such as computer 254 or STB 256. Likewise, ONT 252 may receive data from any device in customer premises 250 and may transmit the data to other devices in network 200, e.g., through a fiber optic cable. ONT 252 may provide customer premises 250 with Internet access, television access, or telephone service, for example.

Computer 254 may include a laptop, a desktop, a tablet computer, a mobile telephone, a personal digital assistant (PDA), or another computation and/or communication device. Computer 254 may include a microphone for capturing audio and/or a camera for capturing images or video. Computer 254 may also include a display for showing images or video or a speaker for playing audio. Computer 254 may connect to network 270 (e.g., the Internet) through ONT 252 and VSO 240, for example. Computer 254 may interact with data center 210 to provide a user with the ability to customize content as described herein. For example, personal computer 254 may provide the user with a browser or other tool to edit or customize programs. Personal computer 254 may also be associated with display 102, also shown in FIG. 1.

STB 256 may receive content and output the content to TV 258 for display. STB 256 may include a component (e.g., a cable card or a software application) that interfaces with (e.g., plugs into) a host device (e.g., a personal computer, TV 258, a stereo system, etc.) and allows the host device to display content. STB 256 may also be implemented as a home theater personal computer (HTPC), an optical disk player (e.g., digital video disk (DVD) or Blu-Ray™ disc player), a cable card, etc. STB 256 may receive commands or data from other devices in network 200, such as remote control 260, and may transmit data to other devices in network 200 (e.g., to data center 210).

TV 258 may output content received from STB 256, for example. TV 258 may include speakers as well as a display. Remote control 260 may issue wired or wireless commands for controlling other electronic devices, such as TV 258 or STB 256. Remote control 260, in conjunction with STB 256, may allow a user to interact with an application running on STB 256. Other types of devices (e.g., a keyboard, mouse, mobile phone, etc.) may be used instead of remote control 260. In one embodiment, TV 258 and/or STB 256 may be associated with a camera and a microphone for capturing user-generated clips or content.

Customer premises 250 may connect to VSO 240. VSO 240 may deliver content to customer premises 250 and may receive data from customer premises 250 for forwarding to the proper destination (e.g., data center 210). VSO 240 may include a content server for transcoding and multiplexing content from different sources for delivery to customer premises 250. VSO 240, VHO 230, data center 210, and other devices in network 200 may form part of a high-speed fiber optic network (e.g., FiOS™). For example, the content server in VSO 240 may multiplex ads (e.g., from ad server 236) into content from data center 210. For example, ad server 236 may insert ads into custom programs, stored in custom program database 215 and delivered to customer premises 250.

Data center 210 may include one or more servers (e.g., "network devices") that manage and/or store programs and clips associated with customizing programs. As shown in FIG. 2, data center 210 may include a program database 212, a clip database 213, a custom clip database 214, a custom program database 215, a social server 216, and a customization server 217. Devices in data center 210 may include one or more computers for hosting programs, such as a web server (e.g., Apache), a database (e.g., MySQL), or other applications.

Program database 212 may include a server and/or database to store content (e.g., television programs, educational programs, movies, etc.) into which users may insert clips, such as quizzes, polls, video, audio, user-generated content, etc. In one embodiment, program database 212 may also store a metadata database that describes content stored in program database 212. For example, for a movie, the metadata database may store the title, genre, plot, director, cast, etc., of the movie. Metadata about the program titled "The New France," mentioned above with respect to FIG. 1, may indicate that the program is a documentary about France. The metadata may include extended-markup-language data in the ScreenplayXML format, for example.

Clip database 213 may include a server and/or database to store clips that users may insert into a program (e.g., from program database 212). Clips may include quizzes, polls, video, audio, user-generated content, etc. Clips may include interactive content or non-interactive content. Clips database 213 may also include templates from which a user may generate a custom clip. Clip database 213 may include a metadata database that describes the clips, such as the subject matter of the clips, the content of the clips, whether the clips are interactive or not, the type of clip (e.g., a quiz, a poll, a video, audio, etc.).

Custom clip database 214 may store user-generated clips that users may insert into a program. Custom clips, like the clips stored in database 213, may include quizzes, polls, video, audio, user-generated content, etc. Further, custom clips may include interactive content or non-interactive content. Custom clips database 214 may also include templates that a user generated from which to generate user-generated clips. Like clip database 213, custom clip database 214, may include a metadata database that describes the clips, such as the subject matter of the clips, the content of the clips, whether the clips are interactive or not, the type of clip (e.g., a quiz, a poll, a video, audio), etc.

Custom program database 215 may include a server and/or database to store content (e.g., television shows, educational programs, movies, etc.) that users have customized (e.g., content into which users have insert clips, such as quizzes, polls, video, audio, etc). Clips in customized programs may include clips from, for example, clip database 213 and/or custom clip database 214. In one embodiment, custom program database 215 may also store a metadata database that describes content stored in program database 212. For example, for a movie, the metadata database may store the title, genre, plot, director, cast, etc., of the movie, and descriptions of the clips that are inserted into the program. The metadata may include extended-markup-language data in the ScreenplayXML format, for example.

Customization server 217 may include one or more computers for hosting computer programs for allowing users to customize content (e.g., programs stored in program database 212) by inserting clips (e.g., clips from clip database 213 and/or custom clip database 214). Customization server 217 may include a web server that provides a web application for users to edit programs by inserting clips. Thus, users may insert clips into programs from their web browser using, for example, personal computer 254. Customization server 217 may retrieve programs for customization from program database 212, for example, and may store the customized programs in custom program database 215.

Social server 216 may include a database and/or server that stores information about user preferences or other information associated with a user. Social server 216 may associate customized programs stored in custom program database 215 with the corresponding user that customized the program.

VHO 230 may include an on-demand server 232 and an ad server 236. On-demand server 232 may provide on-demand content including programs from program database 212 and/or custom program database 215. On-demand server 232 may also include a catalog of programs (e.g., programs stored in program database 212 and/or custom program database 215) for a user to browse and select. For example, a user in customer premises 250 may select a custom program through on-demand server that is stored in custom program database 215. Ad server 236 may provide and/or manage the advertising content (e.g., commercials) that is presented with other content. In one embodiment, the owner of the custom program may share revenue generated by presenting ads in the custom program.

Network 270 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. Network 270 may include a circuit-switched network, such as a public-switched telephone network (PSTN) for providing telephone services for traditional telephones. Network 270, in conjunction with components in VSO 240, may allow devices at customer premises 250 (e.g., a computer or a set-top box) to connect to other devices also attached to network 270, such as third party web-site servers (not shown) or other customers (not shown).

The exemplary configuration of devices in network 200 is illustrated for simplicity. Network 200 may include more devices, fewer devices, or a different configuration of devices than illustrated in FIG. 2. For example, network 200 may include thousands or millions of customer premises. As another example, network 200 may include a cable modem in a customer premises for receiving and transmitting data. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
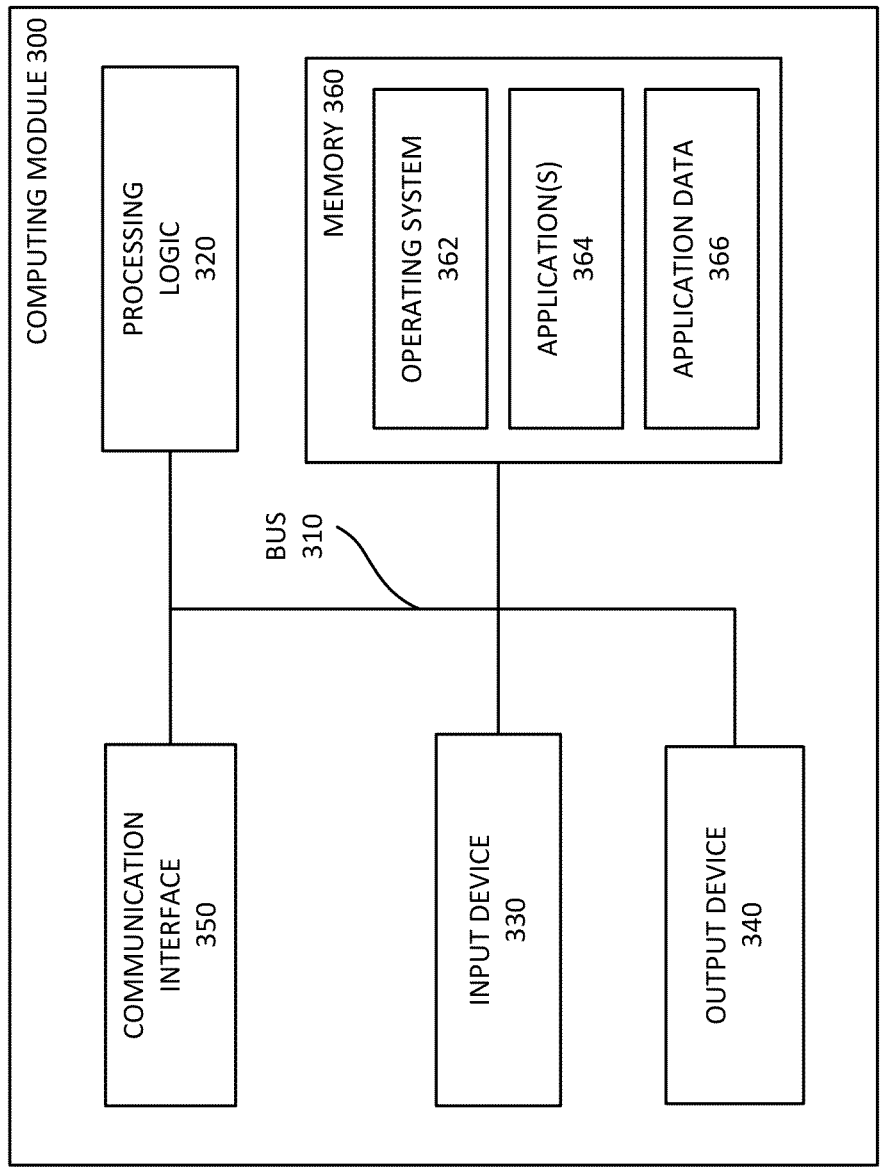
FIG. 3 is a block diagram of exemplary components of a computing module.

Devices in network 200 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), etc.

Input device 330 may allow a user to input information into computing module 300. Input device 330 may include a keyboard, a mouse, a pen, a microphone, a remote control (e.g., remote control 260), an audio capture device, an image and/or video capture device, a touch-screen display, etc. Some devices, such as servers 216 and 217 may be managed remotely and may not include input device 330. In other words, some devices may be "headless" and may not include a keyboard, for example.

Output device 340 may output information to the user. Output device 340 may include a display, a printer, a speaker, etc. For example, TV 258, personal computer 102, and/or display 102 include a display (an output device), which may include a liquid-crystal display (LCD) for displaying content to the user. As another example, ONT 252 and STB 256 may include light-emitting diodes (LEDs). Headless devices, such as servers 216 and 217 may be managed remotely and may not include output device 340.

Input device 330 and output device 340 may allow a user to activate and interact with a particular service or application, such as a web browser or a video editing program. Input device 330 and output device 340 may allow a user to receive and view a menu of options and select from the menu options. The menu may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 364 and operating system 362) and data (e.g., application data 366) for use by processing logic 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 362 may include software instructions for managing hardware and software resources of computing module 300. For example, operating system 362 may include Linux, Solaris, Windows, OS X, iOS, Android, an embedded operating system, etc. Applications 364 and application data 366 may provide network services or include applications, depending on the device in which the particular computing module 300 is found.

Computing module 300 may perform the operations described herein in response to processing logic 320 executing software instructions contained in a computer-readable medium, such as memory 360. A computer-readable medium may include a physical or logical memory device. The software instructions may be read into memory 360 from another computer-readable medium or from another device via communication interface 350. The software instructions contained in memory 360 may cause processing logic 320 to perform processes that are described herein.

Figure 4:
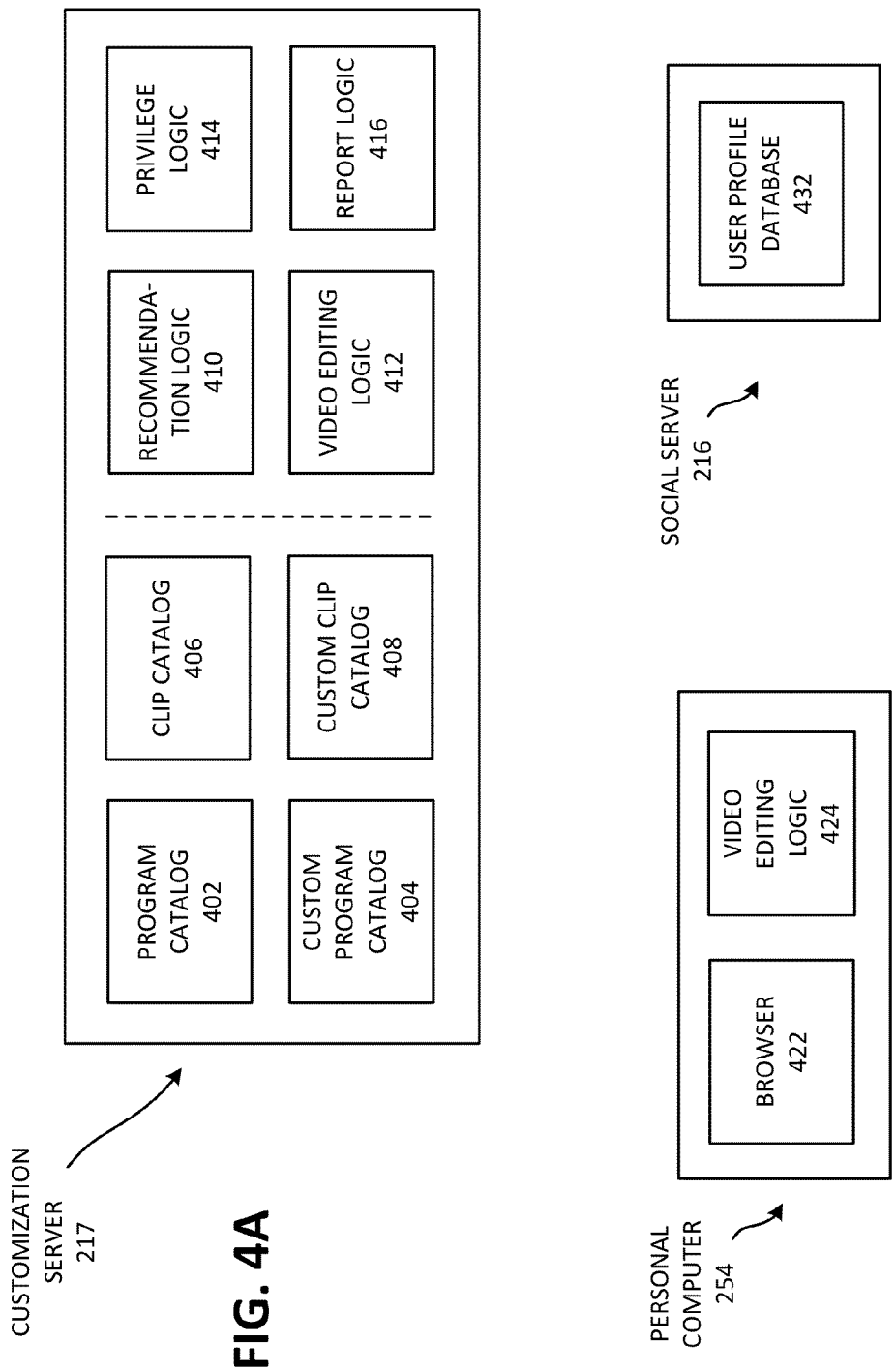
FIG. 4A is a block diagram of exemplary components of the customization server of FIG. 2.
FIG. 4B is a block diagram of exemplary components of the personal computer of FIG. 2.
FIG. 4C is a block diagram of exemplary components of the social server of FIG. 2.

As described above, customization server 217 may provide services to a user to customize a program. FIG. 4A is a block diagram of exemplary components of customization server 217 (e.g., functions performed by application 364 in processing logic 320 or stored in memory 360 of customization server 217). Customization server 217 may include a program catalog 402, a custom program catalog 404, a clip catalog 406, and a custom clip catalog 408. Customization server 217 may also include recommendation logic 410, video-editing logic 412, privilege logic 414, and report logic 416.

Program catalog 402 may include a listing of programs (e.g., professionally-produced content) and associated metadata stored in program database 212. Customization server 217 may query program catalog 402 to recommend programs to users for customizing. Custom program catalog 404 may include a listing of programs that have been customized by users (e.g., professionally-produced content into which a user has inserted user-generated clips) and the associated metadata stored in custom program database 215. Customization server 217 may query custom program catalog 404 to recommend customized programs for viewing or for continued customization.

Clip catalog 406 and custom clip catalog 408 may each store a listing of clips that may be inserted into programs to generate custom programs. Custom clip catalog 408 may also include user-generated content, such as video clips, audio clips, etc., generated by the user. Clip catalog 406 and/or custom clip catalog 408 may include "templates" for a user to generate a clip. For example, one template may allow a user to generate a quiz question. Customization server 217 may query clip catalog 406 and/or custom clip catalog 408 to recommend clips for a user to insert into a program during customization of the program.

Recommendation logic 410 may select programs from program catalog 402 and/or custom program catalog 404 to recommend to the user for customizing. Recommendation of a program may be based on information stored in social server 216 about the user, such as the user's profession, likes and/or dislikes regarding other programs, likes or dislikes of friends of the user regarding other programs, etc. Likewise, recommendation logic 410 may select clips from clip catalog 406 or custom clip catalog 408 to recommend to the user for inserting into a program to be customized. Recommendation of clips may be based on the subject matter of the recommended clip, the subject matter of the program, and/or information stored in social server 216 about the user, for example. Subject matter of the recommended clip and the subject matter of the program may be stored in the metadata in clip database 213, custom program database 215, program database 212, and/or custom clip database 214.

Video-editing logic 412 may allow the user to insert clips into programs for customizing. For example, video-editing logic 412 may provide the user interface shown on display 102 of FIG. 1 for allowing the user to customize a program.

Privilege logic 414 may allow the user to select individuals or groups of people permitted to view a customized program. The groups of individuals may be friends, family, students in a class, students in a school, people in a geographical location, etc. These groups may be defined in social server 216, for example.

Report logic 416 may generate reports related to a customized program. For example, report logic 416 may generate a report indicating the number of people that have viewed a custom program (e.g., by group or geographic region). Report logic 416 may also generate reports related to the number of correct answers to quiz questions inserted into a customized program (e.g., by group or region).

As described above, personal computer 254 may allow a user to interact with customization server 217 to customize a program. FIG. 4B is a block diagram of exemplary components of personal computer 254 (e.g., functions performed by application 364 in processing logic 320 or stored in memory 360 of personal computer 254). Personal computer 254 may include a browser 422 and video editing logic 424. STB 256 and TV 258 may be similarly configured and may also allow a user to interact with customization server 217 to customize a program.

As described above, social server 216 may include information about user preferences. FIG. 4C is a block diagram of exemplary components of social server (e.g., functions performed by application 364 in processing logic 320 or stored in memory 360 of personal computer 254). Social server may include a user profile database 432. User profile database 432 may associate customized programs stored in custom program database 215 with the corresponding user or group of users. User profile database 432 may identify users or groups of users who may be granted permissions to view a custom program or a custom clip. User profile database 432 may also store a list of other users (e.g., contacts) associated with a particular user (e.g., friends, classmates, followers, family, etc.). User profile database 432 may store other information about a user, including a profession (e.g., teacher, lawyer, engineer, etc.), interests (e.g., football, French history, Irish history, hockey, computers), likes and dislikes (e.g., movies enjoyed, movies not enjoyed, television programs enjoyed, etc.), purchase history (e.g., whole milk, organic bananas, Android-powered mobile phone, etc.), places traveled (e.g., Ireland, France, Taiwan, etc.), age, etc. For example, user profile database 432 may store information that a user has a name "Ms. Crabtree" and that Ms. Crabtree is a teacher of French history. User profile database 432 may also store information about each student in Ms. Crabtree's class, including an indication that each user is in Ms. Crabtree's class. User profile database 432 may store data related to customized programs viewed by the user and points scored (e.g., questions answered correctly) with respect to a customized program viewed by a user.

Browser 422 may allow the user to interact with customization server 217 and video editing logic 412. In one embodiment, video editing is provided by a web-based application (e.g., using HTML5 and JavaScript) implemented by video editing logic 412 in customization server 217. In this embodiment, browser 422 interacts with video editing logic 412 in customization server 217 to customize programs. Thus, browser 422 interacting with video-editing logic 412 may provide the user interface shown on display 102 of FIG. 1 for the user to customize a program. In another embodiment, video editing logic 424 may also or alternatively edit video programs for customization. In this embodiment, video-editing logic 424 provides the user interface shown on display 102 of FIG. 1 for the user to customize a program. Other components (not shown) of personal computer 254 may allow for a user to consume programs and custom programs provided by network 200.

Figure 5:
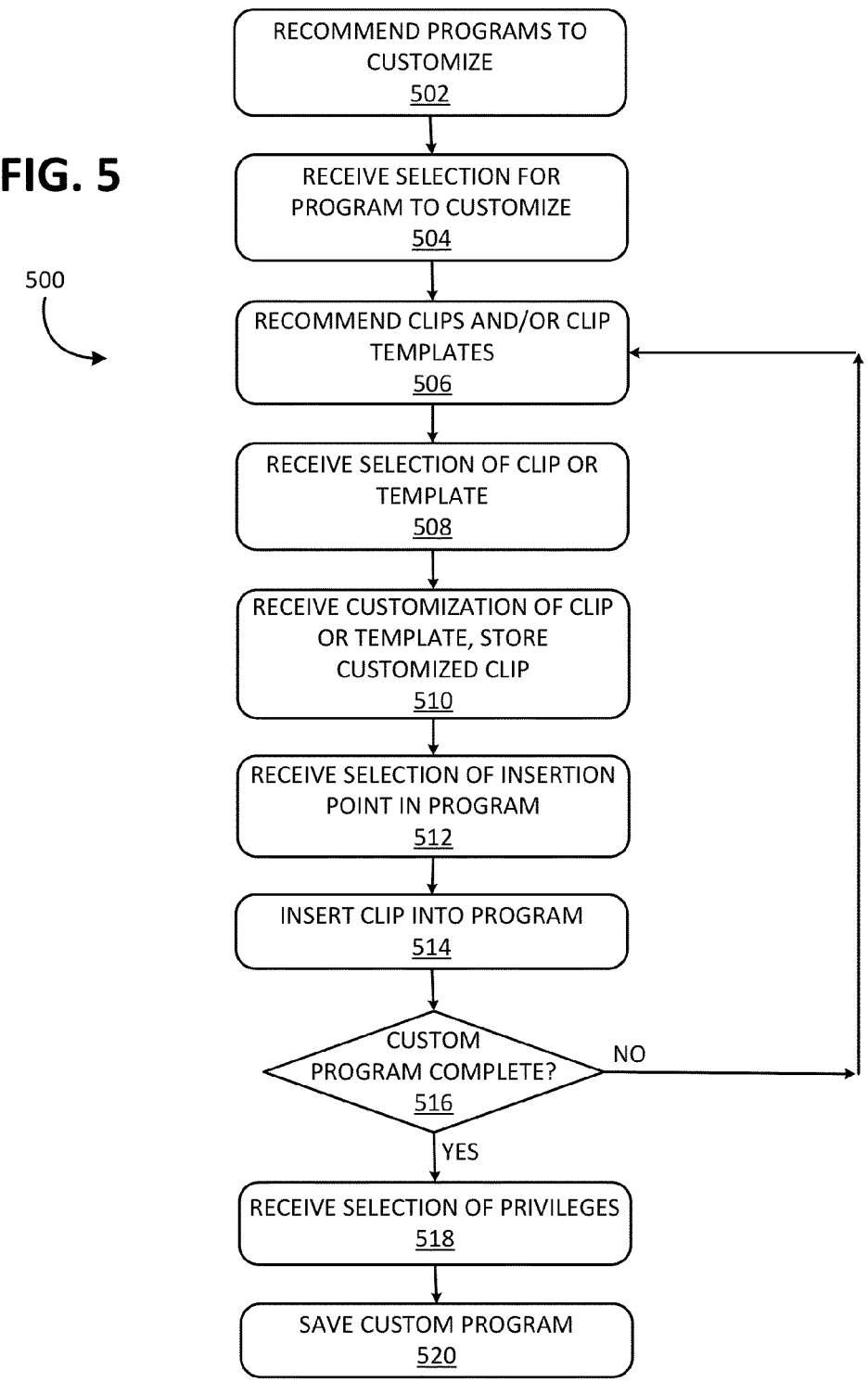
FIG. 5 is a flowchart of an exemplary process for customizing a program.

As described above, network 200 may allow for a user (e.g., a customer in customer premises 250) to create custom programs by inserting clips. FIG. 5 is a flowchart of a process 500 for creating custom programs. The following description of process 500 includes an example in which the user is a school teacher named Ms. Crabtree. In this example, Ms. Crabtree sits at school (e.g., customer premises 250) in front of personal computer 254. She uses a keyboard and a mouse to control browser 422 to interact with customization server 217. While process 500 is described with respect to personal computer 254, STB 256 in conjunction with TV 258 and remote control 260 may also or alternatively be used.

Process 500 may begin, for example, when the user logs into an account at social server 216 and/or customization server 217. Customization server 217 may access program catalog 402 to provide a list of programs that the user may customize. In one embodiment, recommendation logic 410 may recommend programs to the user for customization (block 502). In this embodiment, recommendation logic 410 may compare the user's profile to metadata associated with the programs available for customization. For example, recommendation logic 410 may compare the profile of Ms. Crabtree to the metadata associated with the program titled "The New France," and may determine that the program should be recommended to Ms. Crabtree.

Figure 6A:
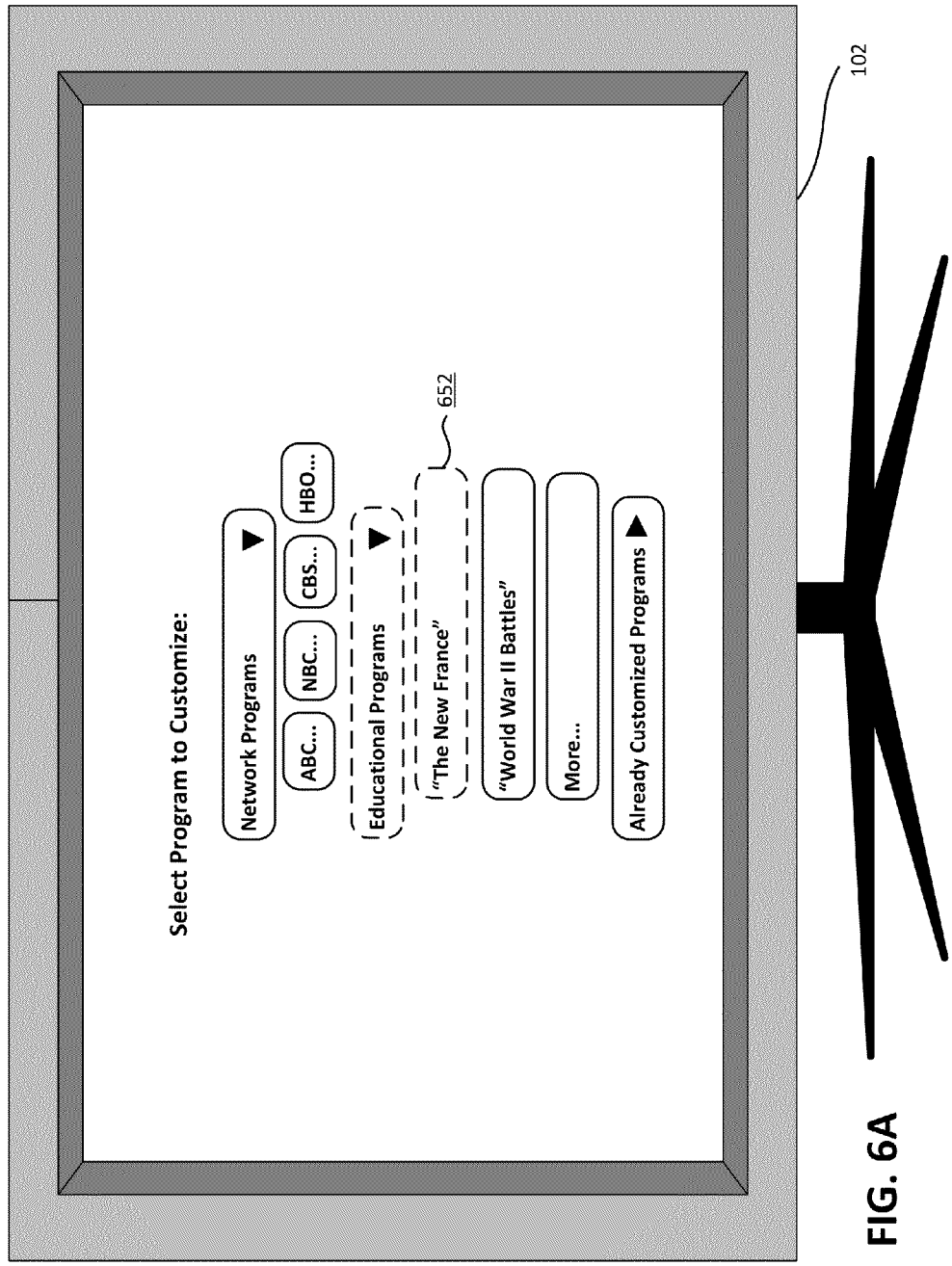
FIGS. 6A through 6F are diagrams of exemplary user interfaces for generating a custom program.

As shown in FIG. 6A, for example, the user (Ms. Crabtree) is presented with a list of programs from which to select for customization. The list includes network programs (e.g., ABC, NBC, CBS, HBO, etc.), educational programs (e.g., "The New France," "World War II Battles," etc.), or programs that have already been customized. The list presented includes "The New France," as determined by recommendation logic 410. In the following example, Ms. Crabtree selects button 652 associated with "The New France," the two-hour educational program about France, for customization. This selection also corresponds to the example above with respect to FIG. 1.

Figure 6B:
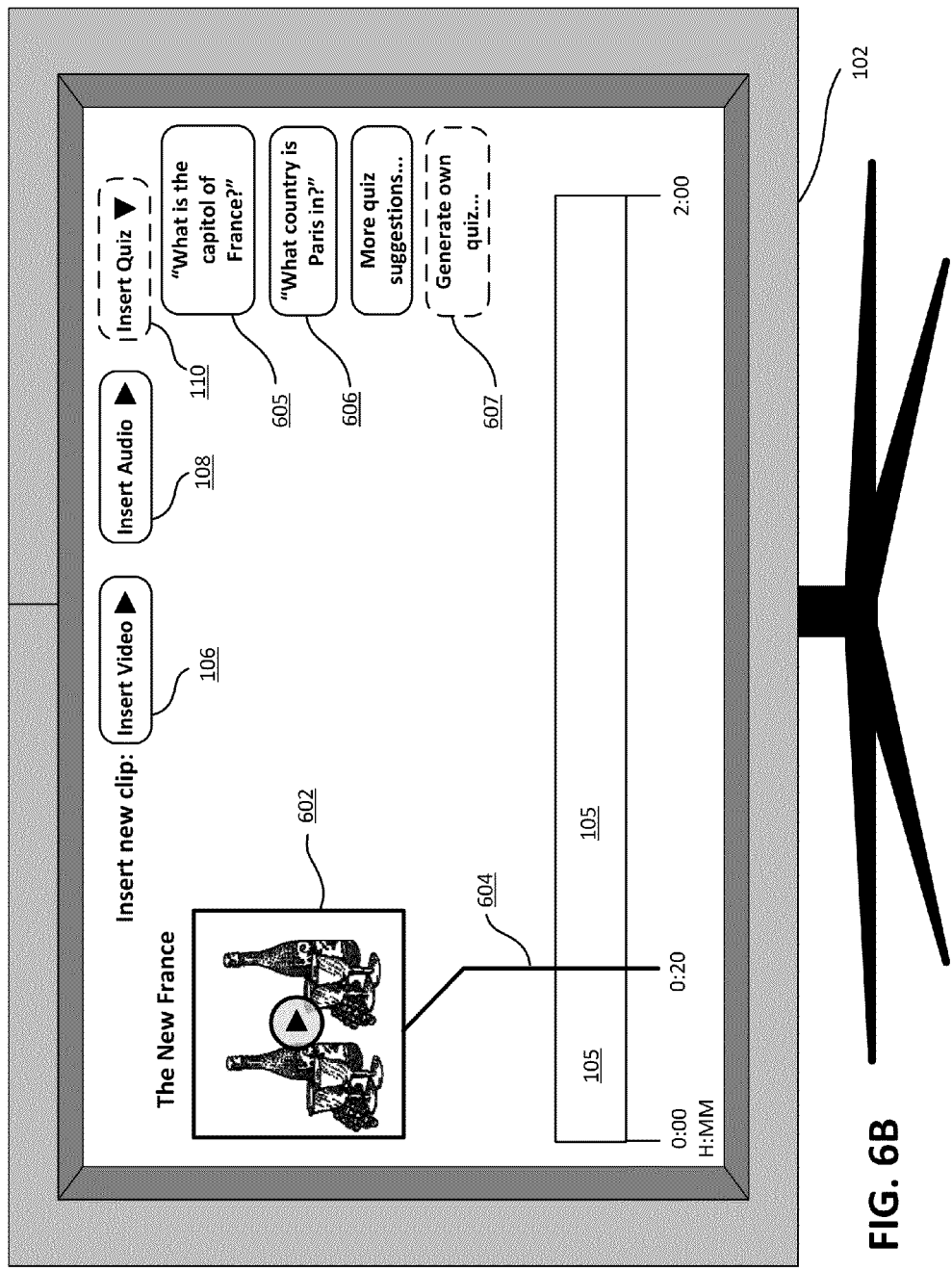

Customization server 217 may receive the selection for the program to be customized by the user (block 504). In the example of FIG. 6B, customization server 217 receives an indication of the selection by Ms. Crabtree of "The New France" documentary. Customization server 217 may retrieve the selected program from program database 212 for delivery to personal computer 254. Delivery to personal computer 254 may be accomplished by video editing logic 412, which may allow the user to watch the program and insert clips into the program. As shown in FIG. 6B, Ms. Crabtree watches the selected program in a window 602 and may, for example, pause and resume play by clicking in window 602. Display 102 includes a timeline 105 that shows the relative time (e.g., relative to the total of two hours) of the current frame displayed in window 602. A current position indicator 604 shows that the frame in window 602 occurs at the twenty minute mark (e.g., "0:20"), where sparkling wine is discussed. In one embodiment, the user may advance or backup play (e.g., "scrub through" the program) by sliding the current position indicator 604 forward or backward using, for example, a mouse or a finger on a touch-screen display.

Customization server 217 may recommend clips and/or clip templates to the user for insertion into the selected program (block 506). Recommendation logic 410 may recommend clips from clip catalog 406 or custom clip catalog 408. In one embodiment, recommendation logic 410 may compare metadata associated with a clip with metadata associated with the program and/or metadata associated with the user. For example, recommendation logic 410 recommends adding a relevant quiz question into the documentary. As shown in FIG. 6B, recommendation logic 410 recommends the following questions to Ms. Crabtree: "What is the capitol of France?" (e.g., button 605) and "What country is Paris in?" (e.g., button 606). Recommendation logic 410 also recommends that the user generate her own question using a template (e.g., button 607). At some point during "The New France," Ms. Crabtree wishes to insert a clip into the selected program. In this example, Ms. Crabtree selects button 607 that corresponds to generating a quiz question from a template (e.g., "Generate your own quiz . . . ").

Figure 6C:
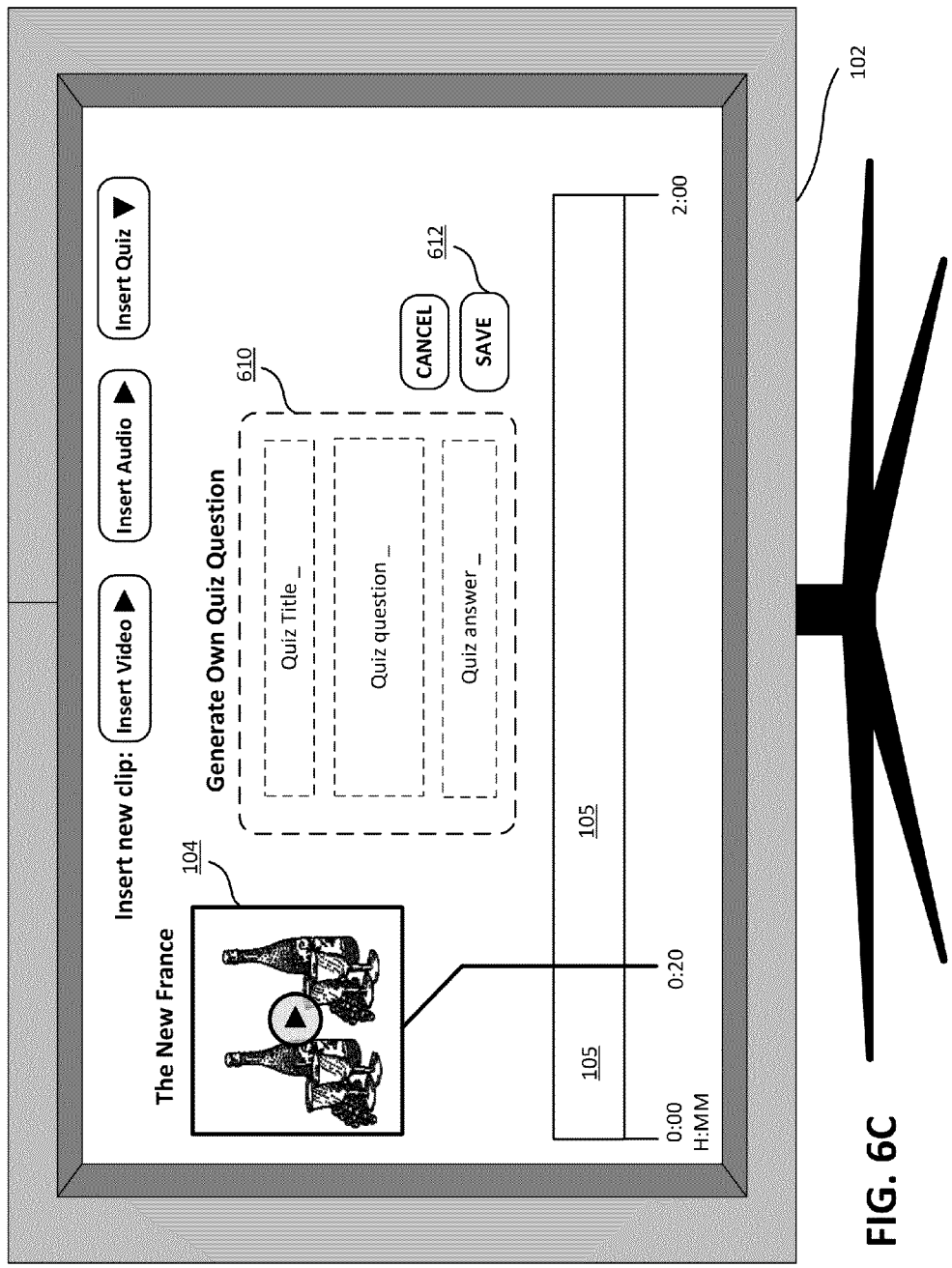

Customization server 217 may receive a selection of a clip or template (block 508). Customization server 217 may receive the selection of button 607 from the user and may fetch the selected clip from clip database 213 or custom clip database 214. As shown in FIG. 6C, the user may be presented with a template 610. In the field labeled "Quiz Title," Ms. Crabtree enters "Test your knowledge!" In the field labeled "Quiz question," she enters "What region of France is Champaign from?" In the field labeled "Quiz answer," she enters "Champaign." Ms. Crabtree then selects SAVE button 612 to save the quiz question. Customization server 217 may receive the customization of the selected clip or template and may store the customized clip or template (block 510).

Figure 6D:
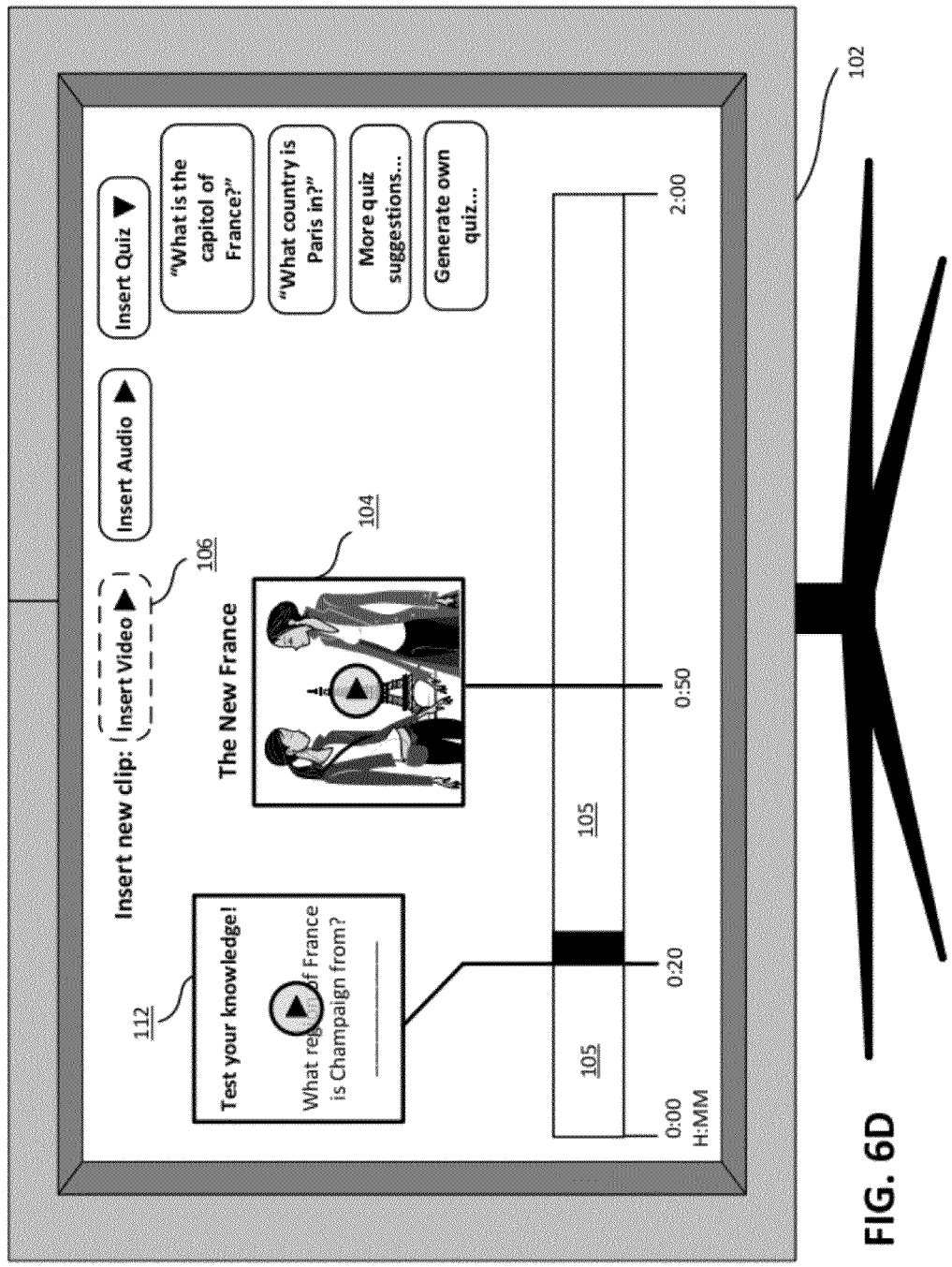

The user may select the time during the program to insert the clip by either pausing playback at the desired time, selecting the customization button 607 at the desired time, or entering the desired time when asked by customization server 217. Customization server 217 may receive the selection by the user of the insertion point for the clip into the program (block 512) and may insert the clip into the program (block 514). As shown in FIG. 6D, the custom clip (e.g., a custom quiz question) is inserted into the program at the 20 minute (0:20) mark. The user may continue customizing the clip by, for example, inserting audio at the same location so that the viewer of the customized program may not be confronted with silence while answering the question.

If the customization is not complete (block 516: NO), then process 500 may continue at block 506 where more clips and/or templates are recommended to the user. As also shown in FIG. 6D, the user has advanced play of the program to 50 minutes, where two historians discuss discusses the Eiffel tower in Paris. Customization server 217 may continue to recommend inserting a quiz into the program "The New France." In this case, however, the user selects "Insert Video" (e.g., button 106).

Figure 6E:
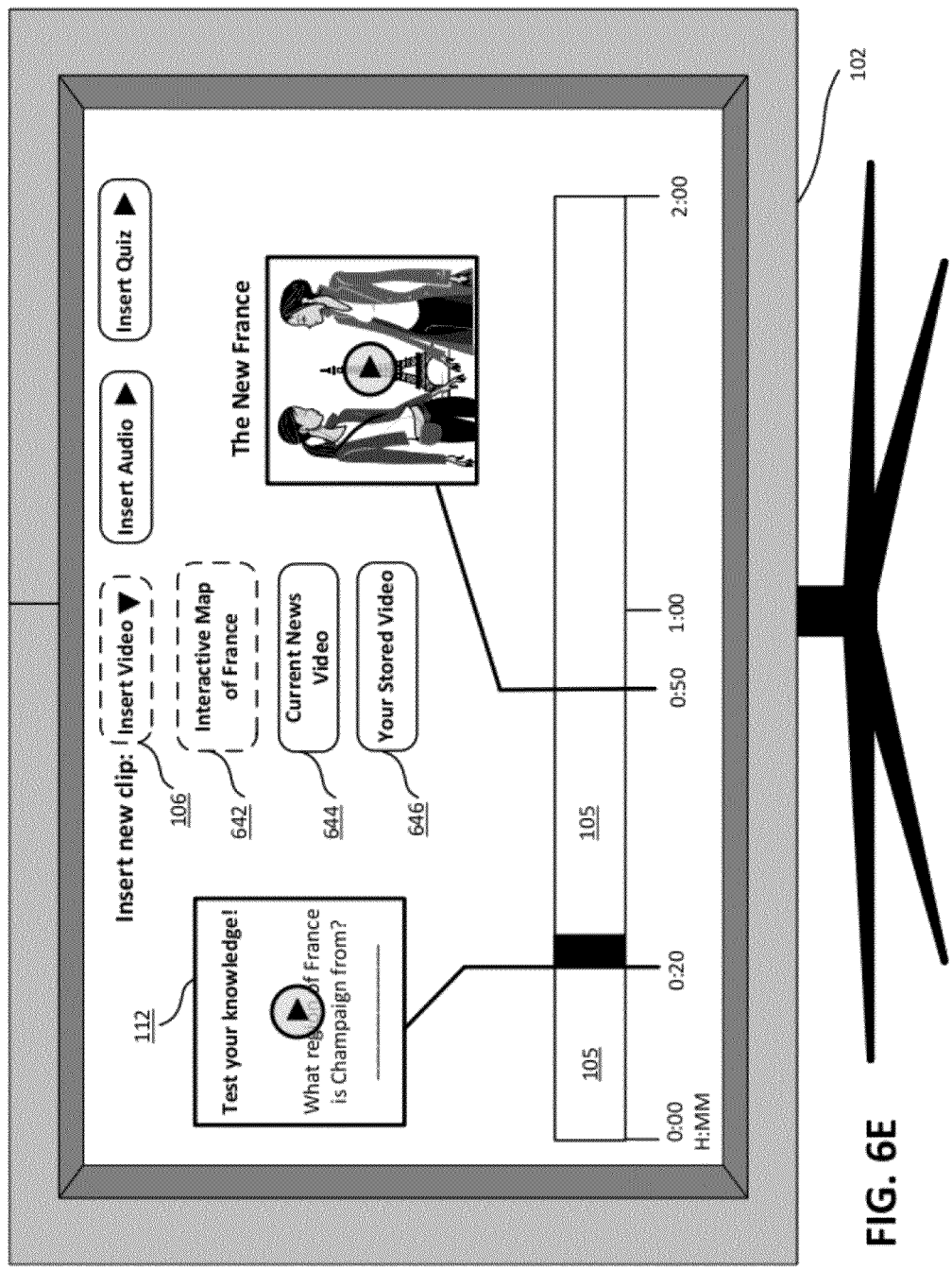

As shown in FIG. 6E, customization server 217 may recommend the following clips: "Interactive Map of France" (button 642), "Current News Video" (button 644), and "Your Stored Video" (button 646). In this example, the user selects "Interactive Map of France" (e.g., button 642). Customization server 217 receives the selection (block 508), which may not require a customization. As before, the user may select the insertion point by pausing the program at the desired time, selecting "Insert Video" (button 106) at the desired time, or entering the desired time (e.g., 0:50) (block 512). In this example, customization server 217 inserted the clip (e.g., the interactive map of France) into the program (block 514).

Figure 6F:
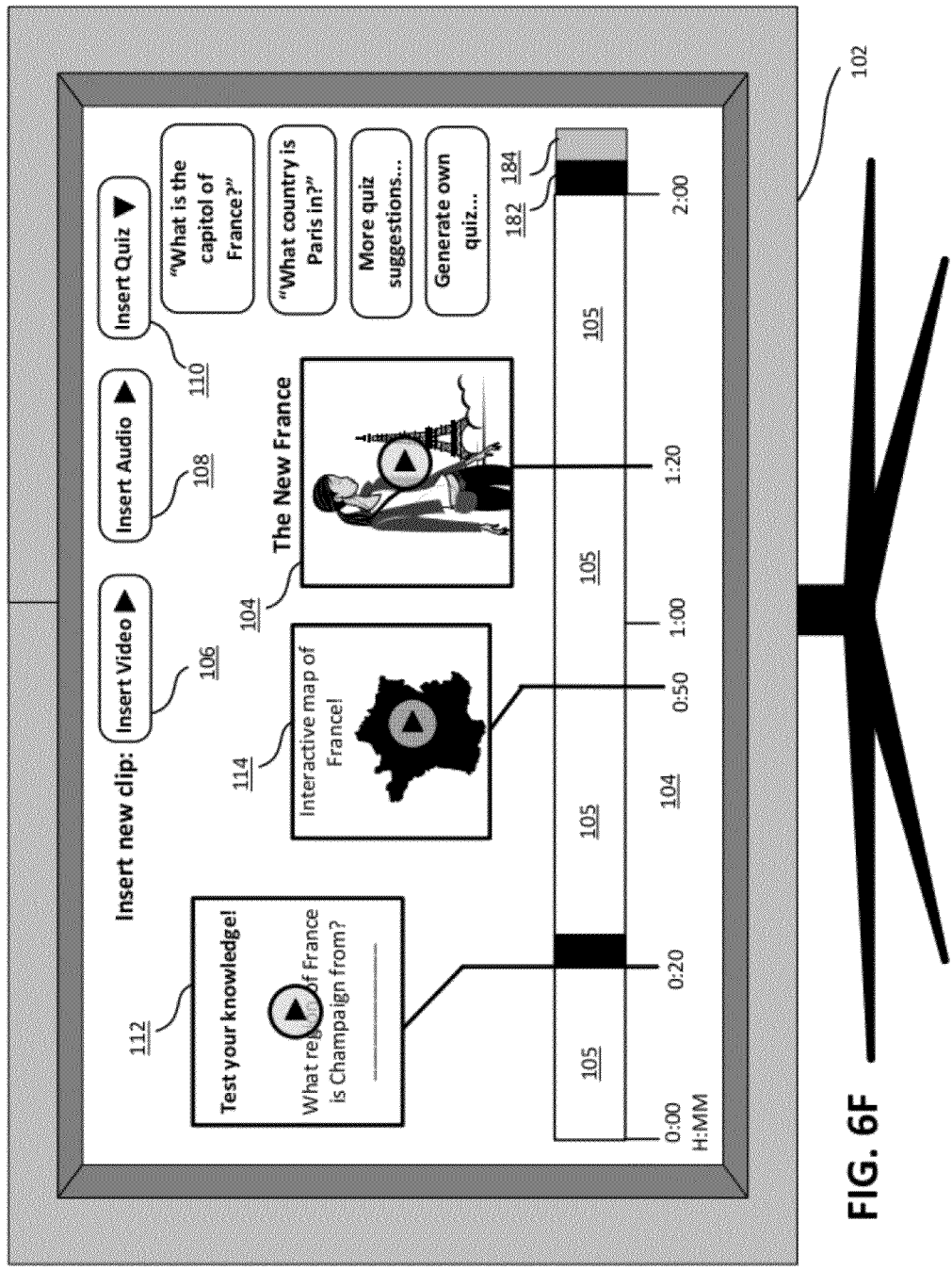

If the customization is not complete (block 516: NO), then customization server 217 may continue to customize the program (e.g., blocks 506-514). In the current example, Ms. Crabtree inserts two more clips at the end of the program, as shown in FIG. 6F (e.g., clips 182 and 184). Clips 182 and 184 may be video clips that Ms. Crabtree captured using the camera and microphone associated with personal computer 254. The user may insert these user-generated clips, for example, by selecting button 646 (see FIG. 6E) associated with "Your Stored Video."

If the customization is complete (block 516: YES), then customization server 217 (e.g., privilege logic 414) may receive the user's selection of privileges (block 518). For example, Ms. Crabtree may indicate that only some groups (e.g., her students, follow teachers, school administrators, friends, family, etc.) may view the customized content. The groups associated with the user may be stored in social server 216, for example. The user may access social server 216 to define the groups of people with permission to view the custom program. In one embodiment, the user may allow the world to see the custom program.

The customized program may be saved (block 520) in, for example, custom program database 215. In one embodiment, the saved custom program may include metadata (e.g., XML data) that identifies the underlying program (e.g., selected at block 504), identifies the inserted clips (e.g., determined at blocks 508-512), and identifies where in the underlying program that clips are inserted. In this embodiment, the underlying program may not have to be reproduced to generate the saved custom program. Further, playback of the custom program may include pausing the underlying program while playing the inserted clip, for example. Generating such metadata may be considered "inserting the clip" into the selected program and may also be considered generating the customized program. Further, concatenating (e.g., appending) a clip to a program may also be considered "inserting" the clip into the program.

Figure 7:
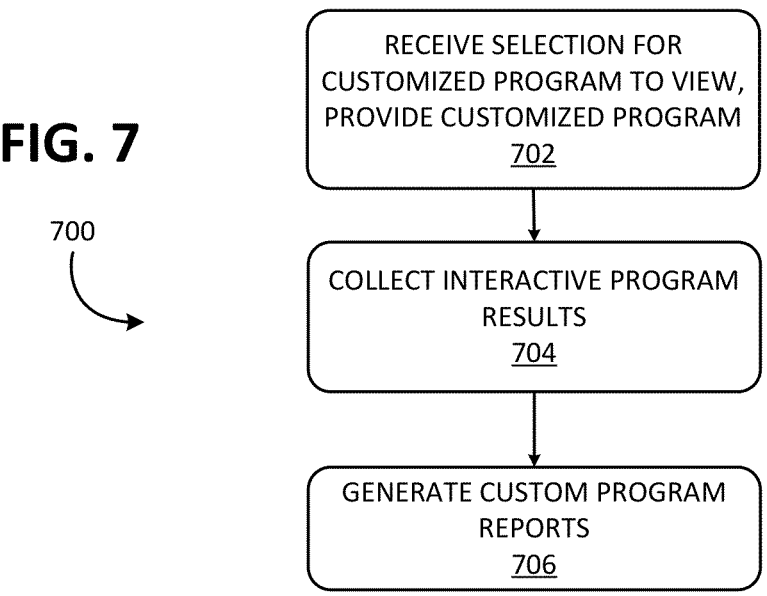
FIG. 7 is a flowchart of an exemplary process for viewing custom programs and generating reports about those custom programs.
Figure 8A:
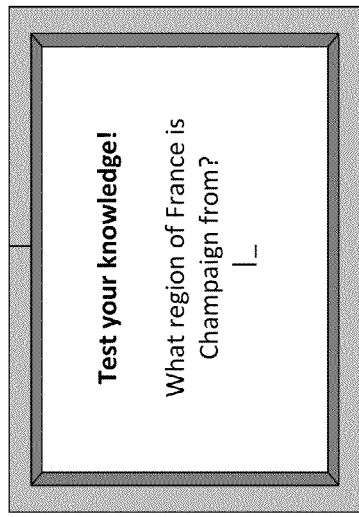
FIGS. 8A through 8D are diagrams of the custom program generated in the example of FIGS. 6A through 6F.
Figure 8B:
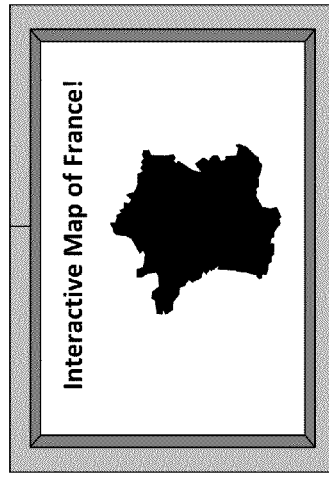
Figure 8C:
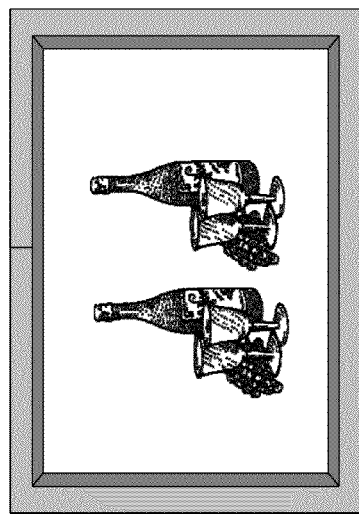
Figure 8D:
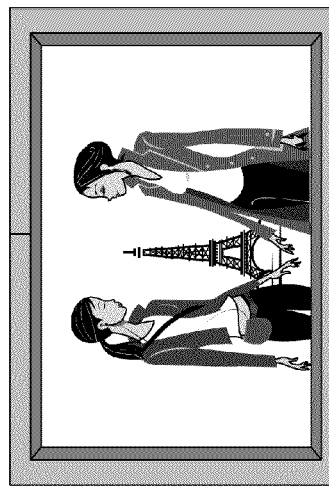

Privileged users may view the customized program. FIG. 7 is a flowchart of a process 700 for users to view customized content. Process 700 may begin with a student in Ms. Crabtree's class logging into his account on social server 216 and discovering that he has been invited by Ms. Crabtree to view the customized program "The New France—with clips from Ms. Crabtree." Alternatively, the student may see the customized program when browsing programs offered by on-demand server 232. The student may then select and watch the program. Customization server 217 may receive the selection for the customized program and may provide the customized program to the user (block 702). For example, the student may view the program "The New France," as shown in FIG. 8A. After watching the program for 20 minutes, the student is presented with a quiz question as shown in FIG. 8B. After answering the question, the program continues, until reaching the scene shown in FIG. 8C (e.g., after 50 minutes of the program), after which the student is presented with an interactive map of France, as shown in FIG. 8D. Although not shown, the program may continue through to the end, where the user is presented with additional clips 182 and 184 inserted by Ms. Crabtree. In one embodiment, ad server 236 may insert ads into the customized program. In this embodiment, the user (e.g., Ms. Crabtree or her school) may share the revenue generated by the ads.

Figure 9:
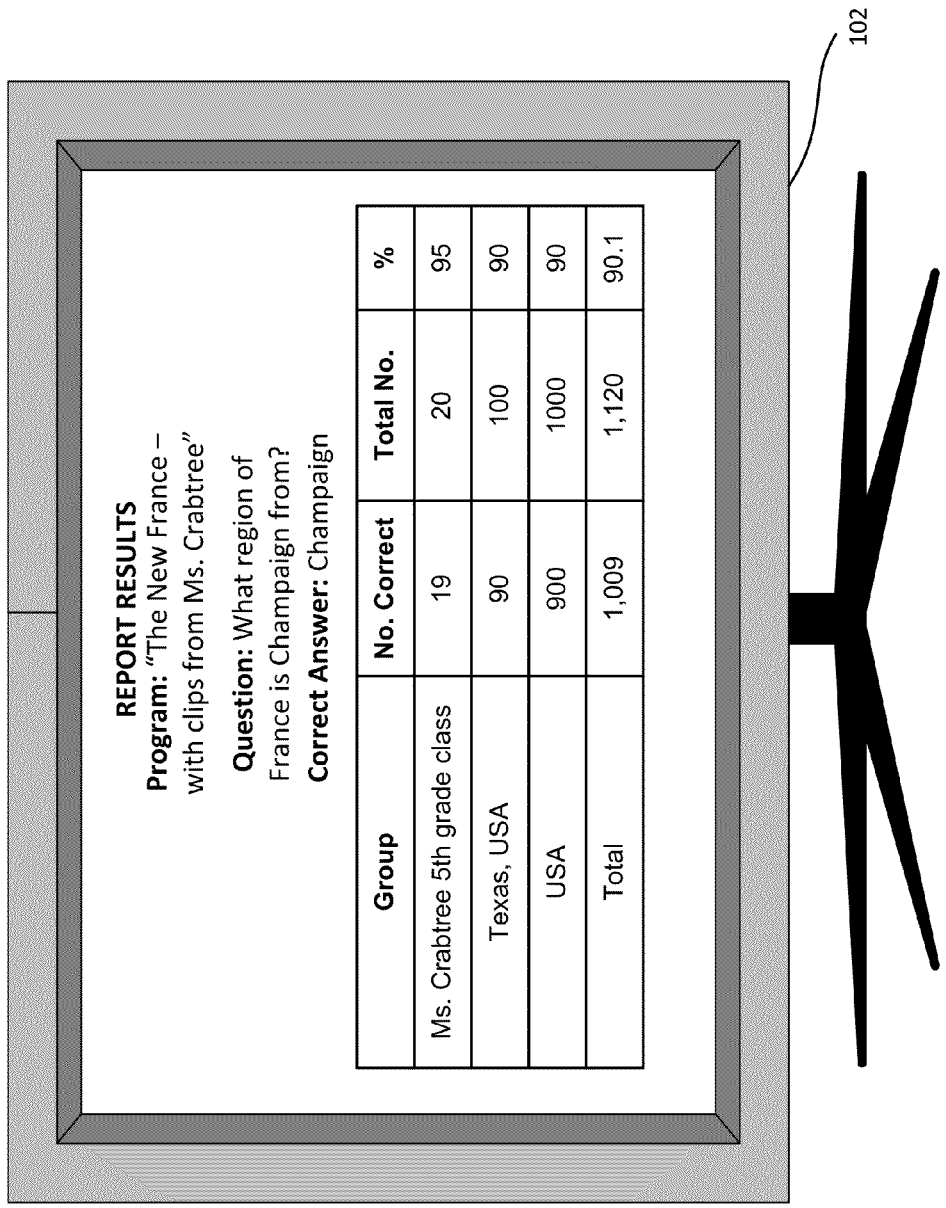

During the program, customization server 217 and report logic 416 may collect the answers to interactive questions for generating reports (block 704). Collecting results may include collecting results over a group of customized programs. For example, Ms. Crabtree's class may score points with respect to customized programs presented to her class. Points may be redeemed for gifts or prizes, for example. A user (e.g., Ms. Crabtree) may log into customization server 217 and may generate reports regarding the custom program (block 706). For example, as shown in FIG. 9, the user (e.g., Ms. Crabtree) may view results of report logic 416, such as determinations of the number of people who have viewed the custom program, the number of people who answered interactive questions correctly (e.g., by region or group), etc. As shown in FIG. 10, the user (e.g., a student named John Smith) can view his results relative to the others in his group (e.g., Ms. Crabtree's class). In one embodiment, social server 216 may also allow for a user with sufficient privileges (e.g., John Smith's parents) to view a users (e.g., John Smith's) results. Further, the user may view a ranking of his or her score as compared to other users who have viewed and interacted with the customized program. This embodiment may allow for groups of friends or students to compete for points when answering quiz or trivia questions, for example.

In one exemplary embodiment, users may generate trivia questions related to a program. For example, a fan of the television program "V" may include imbed a clip in the program that includes an interactive quiz question: "What character is played by Laura Vandervoort?" The answer may be defined by the fan as "Lisa." The fan's friends may watch the customized program and compete for points in a competition. The customized program may include ads inserted by ad server 236. The fan may share revenue generated by the ads based on the number of friends that watch the customized program "V." Recommendation logic 410 may recommend clips (e.g., trivia questions) based on the fan's profile and the fan's friends profiles. Recommendation logic 410 may generate trivia quiz questions related to the program (e.g., the last episode of "V") or related to an entire series of programs (e.g., the series "V"). Alternatively, the user can generate his own quiz questions and answers from a template. Scores for the fan and the fan's friends may be stored in social server 216 and viewed by each friend or the fan.

In one embodiment, the user may enter information about the intended audience of a customized program. In this embodiment, recommendation logic 410 may recommend clips based on the intended audience. For example, Ms. Crabtree may indicate that the intended audience includes ten year olds. Recommendation logic 410 may compare this information to metadata about clips stored in clip database 213 or custom clip database 214. Logic 410 may then recommend age-appropriate clips. In another example, the user may identify the intended audience by identifying group (e.g., friends, students, etc.) from social server 216. In this embodiment, recommendation logic 410 may recommend programs by comparing the profile of the intended users with the metadata associated with the clips. Further, recommendation logic 410 may recommend programs to customize based on the intended audience.

In one embodiment, users may share their clips with other users for inserting into programs. In this embodiment, user-generated clips may include privileges similar to the privileges described above with respect to customized programs (e.g., family, friends, colleagues, etc.) Thus, other school teachers may be able to use Ms. Crabtree's video clips 182 and 184, for example.

In one embodiment, recommendation logic 410 may also recommend programs for customization (block 502) from custom program database 404. In this embodiment, users can continue to customize programs previously saved or customize programs generated by other users.

Embodiments described herein allow users to add user-generated clips to professionally-produced programs; to add professionally-generated clips to professionally-produced programs; to add professionally-produced clips to user user-generated programs; or to add user-generated clips to other user-generated programs.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
transmitting a list of programs available for customization to a user device;
receiving, from the user device, a selection by the user of one of the programs, wherein the selected one of the programs is capable of being paused during playback;
determining a list of clips to recommend to the user based on a user profile associated with the user;
transmitting the list of clips to the user device for customizing the selected one of the programs;
receiving, from the user device, an indication of a time that the selected one of the programs was paused during playback and a selection of one of the clips; and
inserting the selected one of the clips into the selected one of the programs based the time that the selected one of the programs was paused to generate a customized program.

2. The computer-implemented method of claim 1, wherein determining the list of clips to recommend includes determining the list of clips based on information about the selected one of the programs.

3. The computer-implemented method of claim 1, wherein the selected one of the clips includes a quiz question and a quiz answer deemed to be correct, the method further comprises:
transmitting the customized program, including the quiz question, to a plurality of user devices for viewing by a corresponding user;
receiving from each of the user devices a corresponding answer to the quiz question from the corresponding user; and
generating a report based on the number of received answers that match the quiz answer deemed to be correct.

4. The computer-implemented method of claim 3, wherein each user is associated with a user profile, wherein the method further comprises:

determining a score for each user based on whether the received answer for the corresponding user matched the quiz answer deemed to be correct; and associating the score with the corresponding user profile.

5. The computer-implemented method of claim 1, further comprising:

determining a list of recommended programs to recommend to the user based on the user profile, wherein the list of programs transmitted to the user includes the list of recommended programs.

6. The computer-implemented method of claim 1, further comprising:

transmitting a template of a clip to the user device;

receiving a customized clip based on the template, wherein the selected one of the clips inserted into the selected one of the programs includes the customized clip.

7. The computer-implemented method of claim 6, wherein the customized clip includes a quiz question and a quiz answer deemed to be correct.

8. The computer-implemented method of claim 1, further comprising:

receiving a user-generated video, wherein the selected one of the clips includes the user-generated video.

9. A computer-implemented method comprising:

receiving, from a first user device, a selection by a first user of a program to customize, wherein the selected program is capable of being paused during playback;

determining a list of clips to recommend, based on the selected program, and transmitting the list of clips to the first user device for customizing the selected program;

receiving, from the first user device, an indication of a time that the first user paused the selected program during playback and a selection by the first user of one of the clips, wherein the selected one of the clips includes a quiz question;

inserting the selected one of the clips into the selected program based on the time that the first user paused the selected program to generate a customized program;

transmitting the customized program to a plurality of user devices for viewing by a corresponding user;

receiving, from each of the plurality of user devices, a corresponding answer to the quiz question from the corresponding user; and determining a score for each of the corresponding users based on whether the received answer matches a quiz answer deemed to be correct.

10. The computer-implemented method of claim 9, wherein each user is associated with a user profile, wherein the method further comprises associating each score with the corresponding user profile.

11. The computer-implemented method of claim 10, further comprising generating a report based on the number of received answers that match the quiz answer deemed to be correct.

12. The computer-implemented method of claim 9, further comprising:

transmitting a list of programs available for customization to the user first device, wherein the list of programs includes the selected program to customize.

13. The computer-implemented method of claim 12, further comprising:

determining a list of recommended programs to recommend to the first user based on a comparison of a user profile associated with the first user and information regarding each of the programs in the list of recommended programs, wherein the list of programs transmitted to the user includes the list of recommended programs.

14. The computer-implemented method of claim 9, wherein determining the list of clips to recommend to the first user includes determining the list to recommend based on a user profile associated with the first user.

15. The computer-implemented method of claim 9, further comprising:

transmitting a template of a clip to the first user device;

receiving a customized clip based on the template, wherein the selected one of the clips inserted into the selected program includes the customized clip.

16. The computer-implemented method of claim 9, further comprising:

receiving a user-generated video; and inserting the user-generated video into the selected program to generate the custom program.

17. A system comprising:

a network device comprising:

a transmitter to transmit, to a user device, a list of programs available for customization and a list of clips for customizing a selected one of the programs, wherein the selected one of the programs is capable of being paused during playback;

a receiver to receive, from the user device, an indication of a time that the selected one of the programs was paused during playback and a selection by the user of the selected one of the programs; and a processor to determine the list of clips based on the selected one of the programs and a user profile associated with the user and to insert one of the clips into the selected one of the programs program based on the time that the selected one of the programs was paused during playback to generate a customized program.

18. The system of claim 17, wherein the one of the clips includes a quiz question and a quiz answer deemed to be correct;

wherein the transmitter is configured to transmit the customized program, including the quiz question, to a plurality of user devices for viewing by a corresponding user;

wherein the receiver is configured to receive from each of the user devices a corresponding answer to the quiz question from the corresponding user; and wherein the processor is configured to generate a report based on the number of received answers that match the quiz answer deemed to be correct.

19. The system of claim 18, wherein each user is associated with a user profile, and wherein the processor determines a score for each of the users based on whether the received answer for the corresponding user matched the quiz answer deemed to be correct, and associates the score with the corresponding user profile.

20. The system of claim 17, wherein the processor determines a list of recommended programs to recommend to the user based on a comparison of the user profile and information about each of the programs, and wherein the list of programs transmitted to the user includes the list of recommended programs.

21. The system of claim 17, wherein the transmitter is configured to transmit a template of a clip to the user device and the receiver is configured to receive a customized clip based on the template, wherein the processor inserts the customized clip into the selected one of the programs.

* * * * *